US006272825B1

(12) United States Patent
Anderson et al.

(10) Patent No.: US 6,272,825 B1
(45) Date of Patent: Aug. 14, 2001

(54) ROUND BALER HAVING HYDRAULICALLY SEQUENCED CLUTCH AND TAILGATE CYLINDERS

(75) Inventors: J. Dale Anderson, Canton; Ferol S. Fell; Craig Pecenka, both of Newton, all of KS (US)

(73) Assignee: Hay & Forage Industries, Hesston, KS (US)

( * ) Notice: Subject to any disclaimer, the term of this patent is extended or adjusted under 35 U.S.C. 154(b) by 0 days.

(21) Appl. No.: 09/396,065

(22) Filed: Sep. 15, 1999

(51) Int. Cl.[7] .................................................. A01F 15/07
(52) U.S. Cl. ............................................. 56/341; 100/88
(58) Field of Search .............................. 56/341, 344, 345, 56/347, 350, 351, 364, 11.9; 100/88, 87, 89, 5; 414/525.4

(56) References Cited

U.S. PATENT DOCUMENTS

| | | |
|---|---|---|
| 3,748,840 | 7/1973 | Kanengieter et al. . |
| 4,182,101 | 1/1980 | Gaeddert et al. . |
| 4,218,866 | 8/1980 | Parrish . |
| 4,393,764 | 7/1983 | Viaud . |
| 4,424,662 * | 1/1984 | Eggers et al. ............................ 56/341 |
| 4,425,753 * | 1/1984 | Freimuth ................................ 56/341 |
| 4,434,607 * | 3/1984 | Campbell ............................... 56/341 |
| 4,545,298 | 10/1985 | Viaud . |
| 4,567,718 * | 2/1986 | Van Ginhoven ......................... 56/341 |
| 4,674,403 | 6/1987 | Bryant et al. . |
| 5,025,717 | 6/1991 | Viaud et al. . |
| 5,025,718 | 6/1991 | Viaud et al. . |
| 5,263,410 | 11/1993 | Olin . |
| 5,367,865 | 11/1994 | Jennings et al. . |
| 5,598,690 | 2/1997 | McClure et al. . |
| 5,622,104 | 4/1997 | Viesselmann et al. . |
| 5,813,204 | 9/1998 | Pecenka et al. . |
| 5,816,038 | 10/1998 | Anderson et al. . |
| 5,819,515 | 10/1998 | Ratzlaff et al. . |
| 5,855,167 * | 1/1999 | Goossen et al. .......................... 100/5 |

OTHER PUBLICATIONS

Hesston Farm Equipment Operator's Manual 5545/5585 Rounder; Form No. 700 705 288; front and back covers, pp. 1, 9–17 and 25–32 (Jul. 8, 1985).

Hesston The Prime Line 550 Round Baler Operators's Manual; Form No. 700 709 159, Revision B; front and back covers, Introductory Page, pp. III, 19–26 and 49–56 (Dec., 1989).

Hesston The Prime Line 560 Round Baler Operator's Manual; front and back covers, Introductory Page, pp. III, 19–31 (Oct., 1990).

* cited by examiner

Primary Examiner—Robert E. Pezzuto
Assistant Examiner—Árpád Fábián Korács
(74) Attorney, Agent, or Firm—Hovey, Williams, Timmons & Collins (57) ABSTRACT

A round baler includes bale forming mechanism and a crop delivery apparatus for delivering crop material to the bale forming mechanism. A clutch is provided for drivingly disconnecting the bale forming mechanism and delivery apparatus from the driveline while the tailgate is raised to discharge a wrapped bale. Engagement and disengagement of the clutch is controlled by a piston and cylinder assembly, and raising and lowering of the tailgate is controlled by a pair of piston and cylinder units. The baler is provided with a hydraulic sequencing circuit that connects the clutch assembly and the tailgate units to a common source of pressurized fluid. Moreover, the sequencing circuit controls fluid flow to the assembly and the units so that the clutch is disengaged before the tailgate is raised and the clutch is not re-engaged until the tailgate has been closed.

20 Claims, 4 Drawing Sheets

ROUND BALER HAVING HYDRAULICALLY SEQUENCED CLUTCH AND TAILGATE CYLINDERS

BACKGROUND OF THE INVENTION

1. Field of the Invention

The present invention relates generally to round balers and, more particularly, to a hydraulic sequencing circuit that sequences operation of the clutch and tailgate piston and cylinder assemblies so that the tailgate is not raised until the clutch is disengaged (to drivingly disconnect the bale forming components from the source of driving power) and the clutch is not re-engaged until the tailgate is fully closed.

2. Discussion of Prior Art

Some conventional round balers utilize a clutch for drivingly disconnecting at least some of the driveable components (e.g., the pickup, the bale forming mechanism, etc.) while the tailgate is raised to discharge the bale. Those ordinarily skilled in the art will appreciate that such an arrangement significantly reduces the risk of damage to the bale during its discharge from the baling chamber, permits the operator to avoid such damage without having to stop the PTO, etc. Furthermore, it is known to couple the clutch to the tailgate so that the clutch is automatically disengaged when the tailgate is raised.

However, traditional tailgate responsive clutch arrangements are often incapable of declutching the driven baler components before the tailgate is raised. Additionally, some clutch arrangements fail to assuredly declutch the driven components altogether. Even in those conventional balers that provide means for preventing raising of the tailgate before disengagement of the clutch (e.g., a sensor that senses stoppage of the bale forming components and an actuator that activates the tailgate lift only when signaled to do by the sensor), such a construction is typically expensive and complex. It is also known that a number of conventional tailgate responsive clutch arrangements do not have the durability required to withstand normal baler operations.

OBJECTS AND SUMMARY OF THE INVENTION

Responsive to these and other problems, an important object of the present invention is to provide a round baler that successfully addresses the problems associated with the prior art. Another important object of the present invention is to provide a round baler having a clutch arrangement that is inexpensive yet durable. It is particularly an important object of the present invention to provide clutch and tailgate controls that assuredly disengage the clutch before the tailgate is raised and prevents re-engagement of the clutch until the tailgate is fully closed.

In accordance with these and other objects evident from the following description of the preferred embodiment, the present invention concerns a round baler including a clutch that serves to control driving power to the various driven components of the baler (e.g., the bale forming mechanism, the pickup, etc.). A piston and cylinder assembly is provided for engaging and disengaging the clutch. The tailgate is moved into and out of the closed position by at least one piston and cylinder unit. Moreover, the baler includes a sequencing circuit that not only connects the clutch assembly and the tailgate unit to a common source of pressurized fluid, but also controls fluid flow to the assembly and the unit so that the unit is inhibited from moving the tailgate out of the closed position until the clutch is disengaged and the clutch is not re-engaged until at least substantially all movement of the tailgate toward the closed position has been effected.

Other aspects and advantages of the present invention will be apparent from the following detailed description of the preferred embodiment and the accompanying drawing figures.

BRIEF DESCRIPTION OF THE DRAWING FIGURES

A preferred embodiment of the invention is described in detail below with reference to the attached drawing figures, wherein.

DETAILED DESCRIPTION OF THE PREFERRED EMBODIMENT

Figure 1:
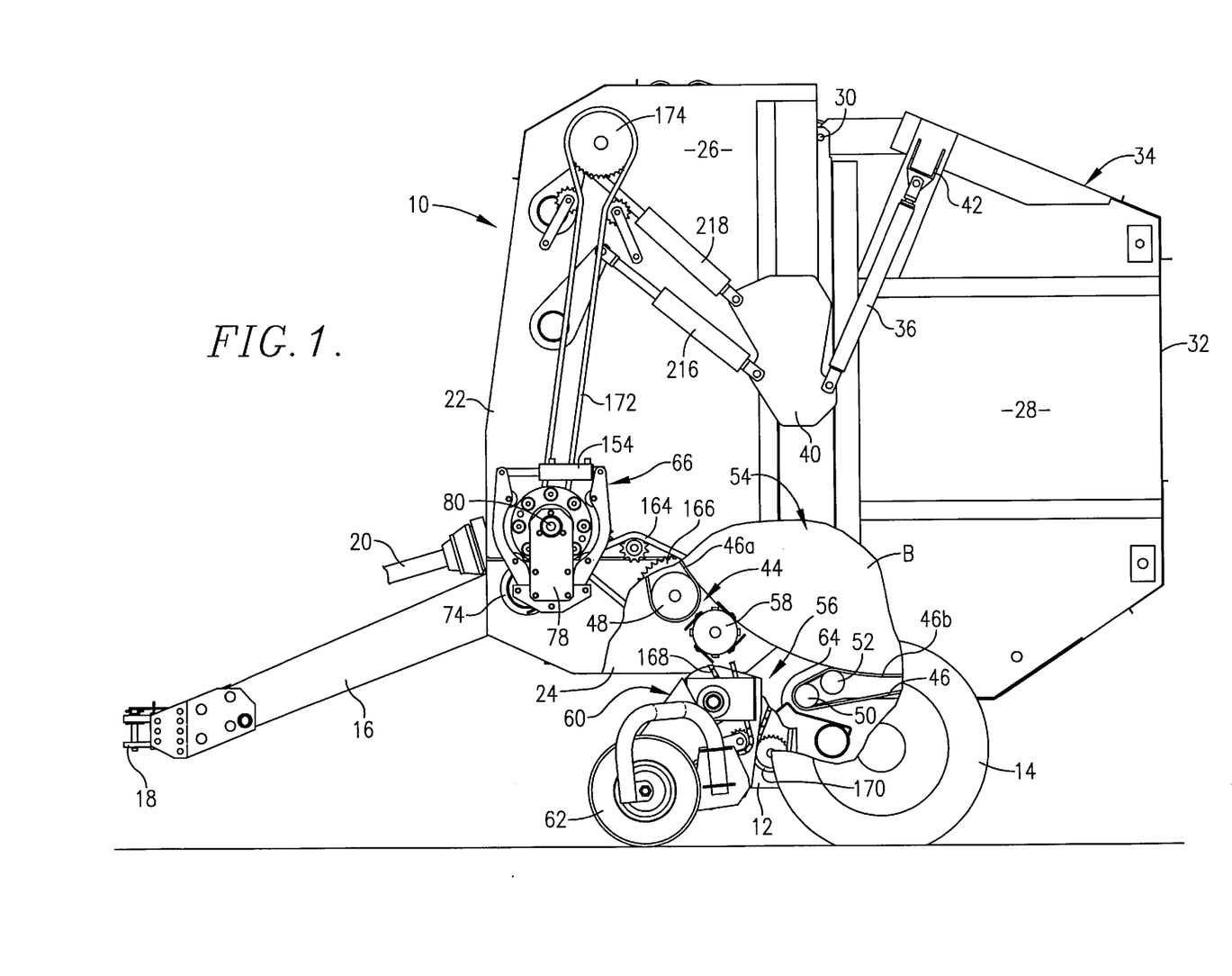
FIG. 1 is a side elevational view of a round baler constructed in accordance with the principles of the present invention, particularly illustrating some of the driveable baler components and one of the piston and cylinder units for raising and lowering the tailgate.

Turning initially to FIG. 1, the round baler 10 selected for illustration includes a chassis 12 that is supported for travel by a pair of ground wheels 14 (only one wheel being shown in the drawing figures). A tongue 16 projects forwardly from the chassis 12 and has a suitable hitch 18 provided at the front end for connecting to a towing vehicle (not shown). A driveline 20 extends along the tongue 16 for connection to the power takeoff shaft (also not shown) of the towing vehicle.

The chassis 12 supports a pair of laterally spaced apart sidewalls 22 and 24 which generally define the area in which baling forming and wrapping operations occur. As particularly shown with respect to the left side wall 20, each of the sidewalls is divided along a generally vertical line to define a front portion 26 that is fixed to the chassis 12 and a rear portion 28 that is swingably supported on the front portion 26 by a pivot 30. The rear portions 28 of the sidewalls 22 and 24 cooperate with a rear wall 32 to define a swingable tailgate 34. In the usual manner, the tailgate 34 is disposed within a closed position (as shown in FIG. 1) during both bale formation and wrapping but can be raised therefrom to an open, discharge position (not shown).

The tailgate 34 is selectively swung between the closed and discharge positions by a pair of hydraulic piston and cylinder units 36 and 38 (see also FIG. 6) disposed exteriorly of the respective sidewalls 22 and 24. As particularly shown on the left side of the baler 10, each unit is pivotally connected between a brace-plate 40 fixed to the front sidewall portion 26 and a lug 42 fixed to the rear sidewall portion 28. Accordingly, raising of the tailgate 34 corresponds with extension of the units 36,38, while lowering of the tailgate 34 corresponds with retraction of the units 36,38. As is customary, the units 36,38 are operably coupled to a latching mechanism (not shown) for releasably latching the tailgate 34 in the closed position during bale formation and wrapping. If desired, the latch mechanism may be similar in principle to the construction disclosed in U.S. Pat. No. 4,182,101, entitled MACHINE FOR COILING FIBROUS CROP MATERIALS INTO LARGE ROUND BALES, assigned of record to the assignee of the present invention. Suffice it to explain that upon extension of the units 36,38, the latching mechanism is first unlatched by the units 36,38 and the tailgate 34 is then swung to the discharge position. Further, the latching mechanism is preferably biased into a latching condition so that the tailgate is automatically latched when it returns to the closed position.

The baler 10 includes mechanism 44 for rolling and compacting crop material in the area defined between the sidewalls 22 and 24. In the illustrated embodiment, the sidewalls 22,24 and the bale forming mechanism 44 cooperatively define a so-called "variable chamber" which is initially relatively small but then grows progressively larger as the bale increases in diameter. It will be appreciated, however, that the principles of the present invention are equally applicable to a fixed chamber machine in which the dimensions of the chamber are substantially constant throughout the baling cycle, with the chamber diameter corresponding to the diameter of the full size bale.

With the foregoing caveat in mind, the illustrated bale forming mechanism 44 includes a series of cooperating belts and transverse rolls supported by the sidewalls 22,24. As is customary for some baler designs, a series of flexible, endless side-by-side belts 46 are looped around a lower drive roll 48 and a pair of tailgate inlet rolls 50 and 52, as well as several other rolls (not shown), such that a baling chamber 54 bounded by the sidewalls 22,24 is defined between the opposite belt stretches 46a and 46b. Those ordinarily skilled in the art will also appreciate that the chamber 54 initially assumes a generally upright, somewhat triangular configuration. The chamber 54 becomes distended and circular in transverse configuration as a progressively growing bale pushes outwardly against the opposite belt stretches 46a and 46b.

The chamber 54 is open at the bottom to present a noncompressive chamber inlet opening 56 that is defined between the forwardmost tailgate inlet roll 50 and a starter roll 58. It will be appreciated that the starter roll 58 is part of the bale forming mechanism 44 and particularly assists with, among other things, core formation at the beginning of the bale forming cycle. Furthermore, the tailgate inlet rolls 50,52 cause the belts 46 to present a stretch that slopes upwardly toward the baling chamber 54 but is spaced from the bale during its formation. Such an arrangement provides an "eased inlet" that is believed to significantly improve crop flow into the baling chamber and onto the bale; as described in U.S. Pat. No. 5,819,515, entitled EASED INLET TAILGATE ROLL ARRANGEMENT FOR VARIABLE CHAMBER ROUND BALER, assigned of record to the assignee of the present invention.

The baling chamber 54 is obviously located well above and off the ground. Therefore, some means must be provided for picking up crop material as the baler 10 moves across the field and for delivering the picked up material into the chamber 54. In the illustrated embodiment, the baler 10 is constructed in accordance with the principles of open throat, vertical chamber baling, such that the incoming crop material is not subjected to any significant compression until it passes through the inlet opening 56 and is fully received within the baling chamber 54. Thus, that part of the crop flow path upstream from the chamber 54 is open and non-compressive and may be described as an open throat through which the picked up crop material passes on its way to the baling chamber 54. It is particularly noted that the illustrated baler 10 is provided with a crop delivery apparatus 60 that serves to pick up crop from the ground, converge any crop outboard of the sidewalls 22,24 inwardly toward the center of the baler 10, and convey the crop upwardly and rearwardly into the chamber 54. One suitable crop delivery apparatus for accomplishing this function is disclosed in co-pending application Ser. No. 08/731,764, filed Oct. 18, 1996, entitled DOWN TURNING STUB AUGERS ON WIDE PICK-UP FOR ROUND BALERS, assigned of record to the assignee of the present application. The crop delivery apparatus 60 is located generally forward and below the inlet opening 56 and includes a pair of gauge wheels 62 (only one being shown in the drawing figures) that cause the apparatus 60 to follow the contour of the ground. As is customary, the delivery apparatus 60 also includes a forwardmost retracting finger pickup reel (not shown) that rotates to pick crop material up off the ground and throw the crop rearwardly toward an upwardly inclined ramp 64. A pair of spaced apart, rotating stub augers (also not shown) converges any crop material located outboard of the baler sidewalls 26,28 centrally so that the converged crop is aligned with the inlet opening 56. The crop is then moved rearwardly up the ramp 64 by a feeder (also not shown), which is often in the form of a plurality of rigid teeth projecting through the ramp 64 and moving along a generally kidney-shaped path of travel. However, the principles of the present invention are equally applicable to various other crop delivery designs. For example, the delivery apparatus 60 may alternatively be provided with only a pickup reel or be designed as a wide pickup utilizing various other center-gathering devices (e.g., rakes).

Those ordinarily skilled in the art will appreciate that it is desirable, in most instances, to disconnect the driven baler components (i.e., the bale forming mechanism 44 and the crop delivery apparatus 60) from driving power before the tailgate 34 is raised to discharge the bale. It is also often preferred that these components not be reconnected to the driving power until the tailgate 34 is completely closed. Such stoppage of the bale forming mechanism 44 and crop delivery apparatus 60 reduces the risk of damage to the bale and baler 10 during bale discharge, as well as provide other known advantages.

Figure 2:
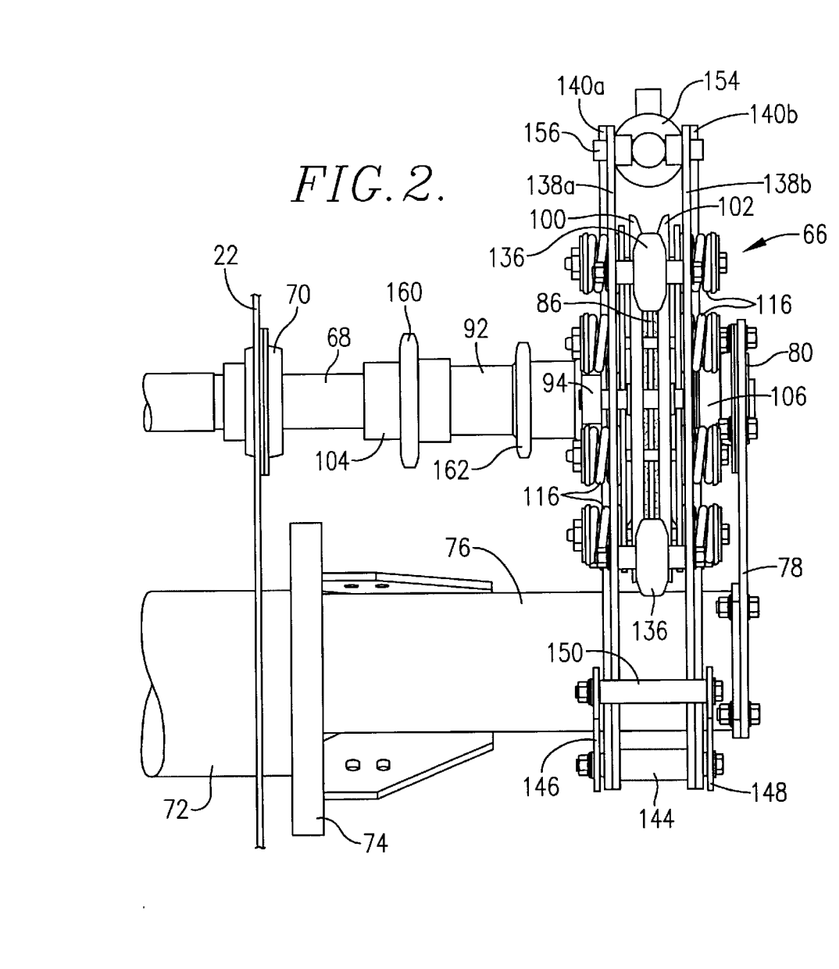
FIG. 2 is an enlarged fragmentary, front elevational view of the clutch supported on the left sidewall of the baler.
Figure 4:
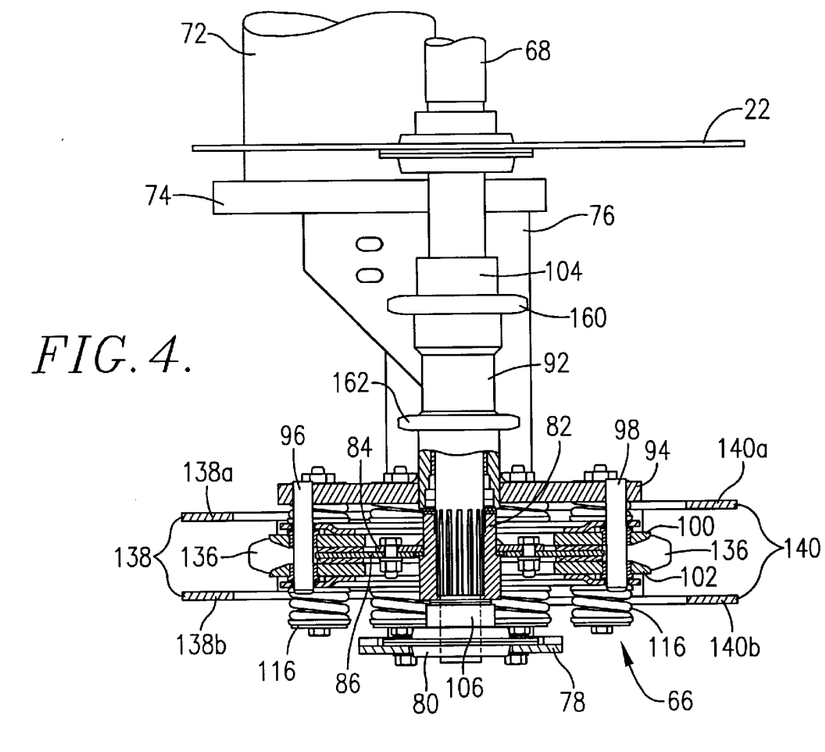
FIG. 4 is a horizontal cross-sectional view taken along line 4—4 of FIG. 3.

The illustrated baler 10 consequently includes a clutch 66 that serves to selectively drivingly connect the bale forming mechanism 44 and the delivery apparatus 60 to the driving power. The clutch 66 in fact has a generally well-known construction and has been used on the assignee's so-called "automatic baler" for approximately the past ten years. Thus, it shall be sufficient to explain that the clutch 66 includes a splined input shaft 68 that is connected to the driveline 20 by a right angle gearbox (not shown) and supported on the left sidewall 22 by a bearing assembly 70 (see FIGS. 2 and 4). The input shaft 68 projects through the sidewall 22, as does a baler framework tube 72. An oblong mounting plate 74 is fixed to the left end of the framework tube 72, and a gusseted tube 76 is supported on the plate 74 in vertical alignment with the input shaft 68. A vertical support plate 78 fastened to the end of the tube 76 carries a bearing assembly 80 that supports the distal end of the input shaft 68.

Received on the externally splined section of the input shaft 68 is an internally splined hub 82 (see FIGS. 3 and 4), such that the hub 82 rotates with the input shaft 68. It is noted that the hub 82 is maintained on the splined section of the input shaft 68 by suitable means which will subsequently be described. The hub 82 includes an outwardly projecting flange 84 (see also FIG. 5) for connecting a friction plate 86 to the input shaft 68. The friction plate 68 is fastened to the flange 84 by four nut and bolt assemblies 88 and is provided with two circumferentially extending friction material rings 90 and 91 on its opposite faces. As will be indicated further below, the rings 90 and 91 are formed of a highly aggressive material (e.g., a material similar to that used in an automotive brake pad) that is designed to cause movement of objects that the material frictionally engages.

An output shaft 92 is concentrically mounted on the input shaft 68 and is selectively drivingly connected to the input shaft 68. A yoke 94 is fixed to the output shaft 92 and includes two arms 94a,94b that project radially in opposite directions from the shaft 92 (see FIG. 4). The arms 94a and 94b carry respective pins 96 and 98 that project through corresponding openings defined in a pair of spaced apart compression plate assemblies 100 and 102. Although the plate assemblies 100 and 102 are slidably received on the pins 96 and 98, this arrangement causes correspondence between rotation of the plate assemblies 100 and 102 and rotation of the output shaft 92. It is noted that a pair of collars 104 and 106 are attached to the input shaft 68, one adjacent the inner end of the output shaft 92 and the other just inside of the bearing assembly 80. It may generally be said that the collars 104,106 serve to maintain the hub 82 and output shaft 92 in the proper locations along the input shaft 68.

Figure 5:
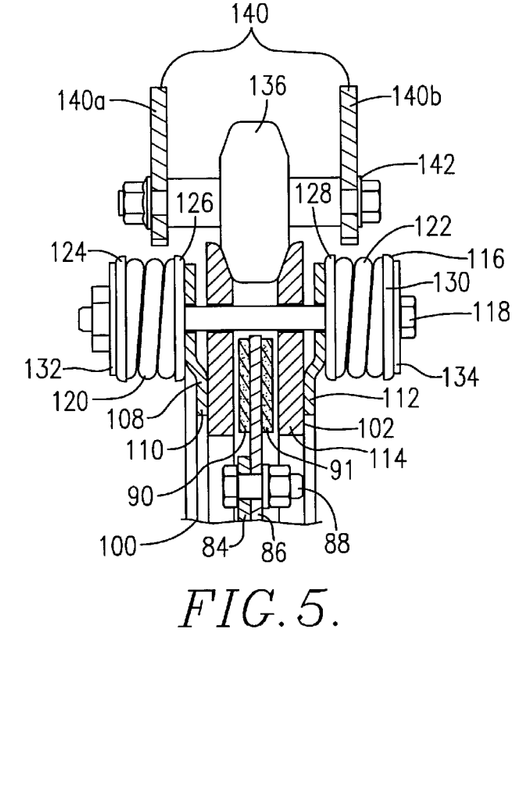
FIG. 5 is an enlarged fragmentary, elevational view of a portion of the clutch, particularly illustrating one of the rollers causing separation of the compression plate assemblies so as to disengage the clutch.

As perhaps best shown in FIG. 5, the inside compression plate assembly 100 includes an outer ring-shaped disk 108 and an inner ring-shaped engagement plate 110 which may be attached to one another if desired. The outside compression plate assembly 102 similarly includes an outer disk 112 and an inner engagement plate 114. A plurality of spring assemblies 116 spaced circumferentially about the plate assemblies 100,102 are configured to yieldably bias the plate assemblies 100,102 toward one another. As shown in FIG. 5, each of the spring assemblies 116 includes a nut and bolt assembly 118 and a pair of double coil springs 120 and 122 received on the assembly 118. Each of the springs 120 or 122 is retained between respective cups 124,126 or 128,130 that are in turn located between the adjacent disk 108 or 112 and an outermost washer 132 or 134. It will be appreciated that the spring assemblies 116 urge the opposed faces of the engagement plates 110 and 114 into contact with the respective material rings 90 and 91, whereby the rotating friction plate 86 drivingly engages the compression plate assemblies 100,102 and thereby causes corresponding rotation of the output shaft 92.

In view of the foregoing, the plate assemblies 100,102 and output shaft 92 may be drivingly disconnected from the input shaft 68 simply by sufficiently separating the plate assemblies 100,102 so that they are removed from the friction plate 86 (i.e., driving contact between the plate assemblies 100,102 and friction plate 86 is terminated). In the illustrated embodiment, such separation is effected by a plurality of rollers 136 rotatably carried on respective swingable arms 138 and 140 (see FIG. 3). It is noted that the arms 138 and 140 each comprises a pair of spaced apart plates 138a,138b and 140a,140b (see FIG. 4), and each roller 136 is supported between the plates of the respective arm by a shaft assembly 142 (see particularly FIG. 5). As perhaps best shown in FIGS. 2 and 3, the lower ends of the arms 138 and 140 are supported on a common pivot 144 that is in turn mounted to the support tube 76 by a pair of brackets 146 and 148. When the arms 138 and 140 are positioned so that the rollers 136 are spaced from the plate assemblies 100 and 102 (e.g., see FIG. 3), the spring assemblies 116 bias the plate assemblies 100 and 102 into driving contact with the friction plate 86 and the output shaft is consequently rotated. However, as the arms 138 and 140 are swung toward one another, the rollers 136 are eventually wedged between the engagement plates 110 and 114 and the plate assemblies 100 and 102 are consequently moved away from one another against the bias of the spring assemblies 116. As perhaps best shown in FIG. 5, the circumference of each roller 136 is tapered and the outer edges of the plates 110 and 114 diverge outwardly so as to promote the wedging action. It is also noted that a pair of stops 150 and 152 are fastened between the brackets 146 and 148 to limit outward swinging movement of the arms 138 and 140. That is to say, each of the stops 150 and 152 is configured to abuttingly engage the respective arm 138 and 140 and thereby limit swinging of the respective arm in a direction away from the other arm.

Figure 3:
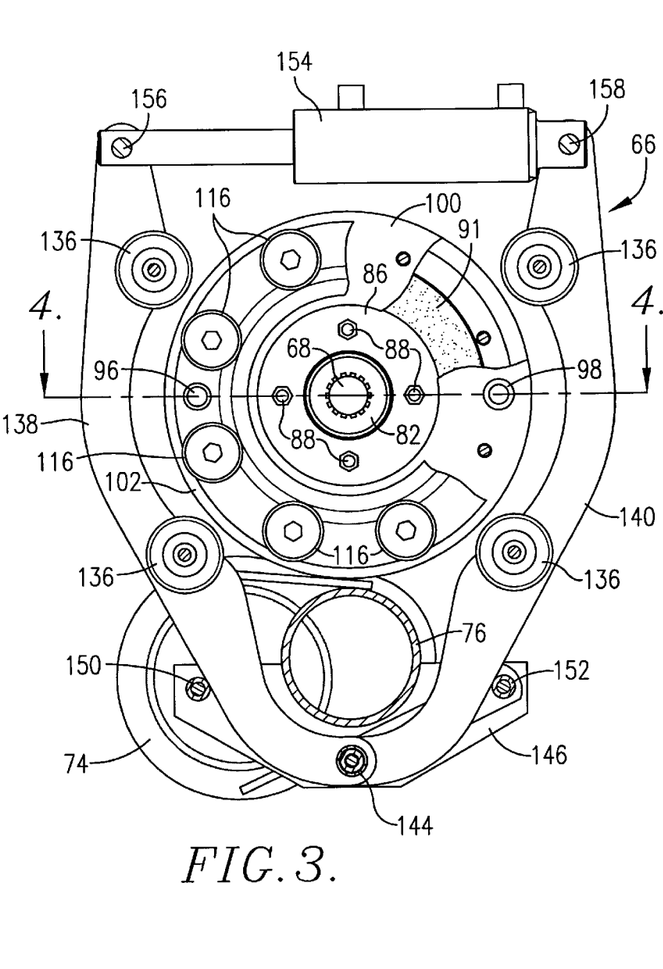
FIG. 3 is a side elevational view of the clutch and piston and cylinder assembly for controlling engagement and disengagement of the clutch, particularly illustrating the assembly in an extended condition so that the clutch is engaged.

A hydraulic piston and cylinder assembly 154 is connected between the upper ends of the arms 138 and 140 for controlling swinging movement of the arms. Particularly, a pin 156 pivotally connects the rod end of the assembly 154 between the plates 138a and 138b, while a pin 158 pivotally connects the cylinder end of the assembly 154 between the plates 140a and 140b. Thus, the rollers 136 are removed from wedging engagement with the plate assemblies 100 and 102 and the clutch 66 is consequently engaged when the assembly 154 is extended (as shown in FIG. 3). Conversely, the clutch 66 may be disengaged by retracting the assembly 154 to swing the arms 138,140 toward one another and thereby bring the rollers 136 into wedging engagement between the plate assemblies 100 and 102. If desired, a pair of sensors (not shown) may be provided for sensing rotation of the input and output shafts 68 and 92. Those ordinarily skilled in the art will appreciate that the output shaft sensor may used for providing a signal to indicate that the clutch has, in fact, disengaged. The sensors may also cooperatively be used to indicate clutch slippage.

As noted above, the clutch 66 is provided in the drive train for the bale forming mechanism 44 and the crop delivery apparatus 60 so that disengagement of the clutch 66 stops operation of these components. It is particularly noted that the output shaft 92 carries two drive sprockets 160 and 162 (see FIGS. 2 and 4). The innermost sprocket 160 is entrained by a chain 164 that wraps around the lower drive roll sprocket 166 (see FIG. 1). Although not shown, it will be appreciated that a pair of chain drives provided on the right side of the baler 10 drivingly connect the starter roll 58 and right stub auger (also not shown) to the lower drive roll 166. The starter roll 58 in turn powers the left stub auger (not shown) and the feeder (also not shown) by respective chain drives 168 and 170 located along on the left side of the baler 10 (see FIG. 1). On the other hand, the outer sprocket 162 is entrained by a chain 172 that extends upwardly and wraps around the upper drive roll sprocket 174. Accordingly, when the assembly 154 is retracted to disengage the clutch 66, driving power from the input shaft 68 is no longer transferred to the output shaft 92 and drive sprockets 160,162. The bale forming mechanism 44 and crop delivery apparatus 60 are consequently disconnected from the power source and their operation stops. When the assembly 154 is extended, however, the output shaft 92 and therefore the bale forming mechanism 44 and crop delivery apparatus 60 are drivingly connected to the rotating input shaft 68.

The baler 10 is particularly designed to sequence operation of the hydraulic clutch assembly 154 with the hydraulic tailgate units 36,38 so that the clutch 66 is disengaged before the tailgate 34 is raised and is not re-engaged until the tailgate 34 is completely closed. Such operation is provided by a sequencing circuit 176 that includes two ports 178 and 180 for connecting the assembly 154 and units 36,38 to a common source of pressurized fluid (see FIG. 6). In this respect, operation of the clutch assembly 154 and tailgate units 36,38 may be controlled by a single tractor remote valve (not shown). The circuit 176 includes first and second lines 182 and 184 that are connected to the ports 178 and 180, respectively. The first line 182 branches at a junction 186 into a tailgate branch 182a leading to the tailgate units 36,38 and a clutch branch 182b leading to the clutch assembly 154. Similarly, the second line 184 includes a tailgate branch 184a and a clutch branch 184b extending from a junction 188. A tailgate sequence valve assembly 190 is interposed within the tailgate branch 182a of the first line 182, and a clutch sequence valve assembly 192 is interposed within the clutch branch 182b of the first line 182. As will subsequently be described, the tailgate sequence valve assembly 190 prevents raising of the tailgate 34 until the clutch 66 is disengaged, while the clutch sequence valve assembly 192 prevents re-engagement of the clutch 66 until the tailgate 34 is closed. A flow restriction valve assembly 194 is provided in the first line 182 between the port 178 and the junction 186, although this valve assembly 194 may be located within the tailgate branch 182a if desired. In any case, the flow restriction valve assembly 194 prevents the tailgate 34 from slamming shut, as will subsequently be described. Finally, the circuit 176 includes a pilot operated check valve 196 in the second line 184, with this valve serving to lock the tailgate 34 in the closed position and to prevent inadvertent clutch disengagement.

Figure 6:
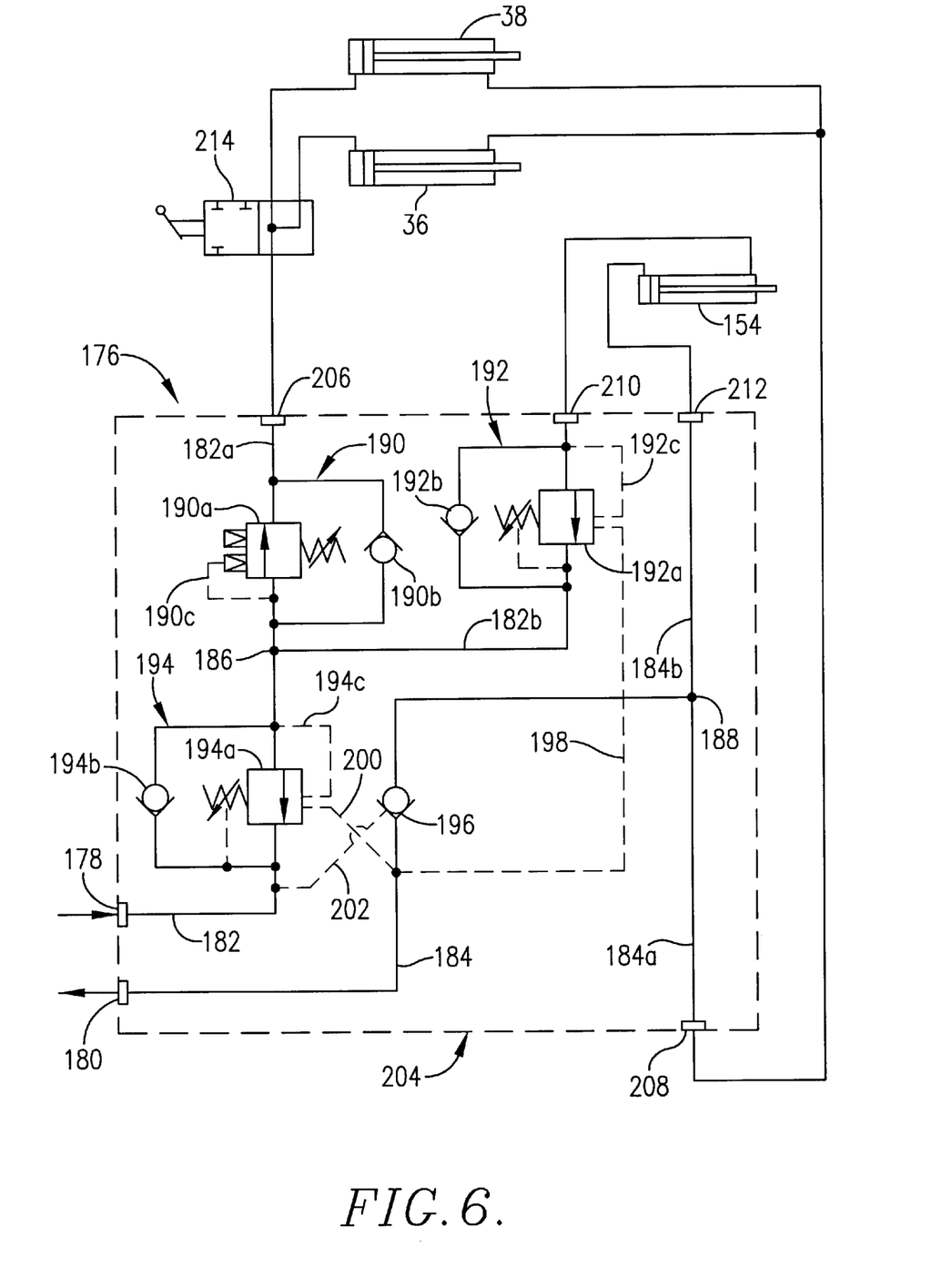
FIG. 6 is a schematic diagram of the hydraulic sequencing circuit for sequencing operation of the tailgate piston and cylinder units and the clutch piston and cylinder assembly.

With particular respect to the construction of each of the valve assemblies, the tailgate sequence valve assembly 190 includes an adjustable relief valve 190a, a check valve 190b that prevents flow toward the tailgate units 36,38 but permits flow in the opposite direction, and a pilot line 190c for opening the valve 190a when the fluid pressure upstream from the valve 190a reaches a predetermined minimum. The valve assembly 190 is preferably constructed as a single unit. A suitable unit is available under the designation "Pilot Operated Kick-Down Sequence Valve" and as Part No. SQFB-FAN from Sun Hydraulics of Sarasota, Fla.

The clutch sequence valve assembly 192 similarly includes an adjustable relief valve 192a, a check valve 192b that prevents fluid flow from the clutch assembly 154 but permits flow in the opposite direction, and a counterbalance pilot line 192c. It is particularly noted that the counterbalance pilot line 192c serves to open the relief valve 192a when the fluid upstream from the valve reaches a selected relief pressure. However, a primary pilot line 198 extends between the second line 184 and the relief valve 192a, with the pilot line 198 being configured to supply a pilot pressure to the relief valve 192a that is in fact greater than the fluid pressure in the second line 184. This step up in pressure can be accomplished by any suitable means. For example, a piston assembly (not shown) having a relatively larger upstream cross-sectional area than its downstream cross-sectional area may be provided in the pilot line 198, whereby the upstream pressure is converted into a relatively higher downstream pressure. In the illustrated embodiment, the pilot line 198 normally causes the opening of the relief valve 192a, and the counterbalance pilot line 192c serves only to open the relief valve 192a in a pressure overload situation.

Similar to the tailgate sequence valve assembly 190, the clutch sequence valve assembly 192 is preferably constructed as a unit. One such unit is available under the designation "Counterbalance Valve" and as Part No. CBV1-6033 from Vickers of Carroll Stream, Ill.

The illustrated flow restriction valve assembly 194 similarly comprises a counterbalance valve. Particularly, the valve assembly 194 includes a relief valve 194a, a check valve 194b that prevents flow from the tailgate power units 36,38 and the clutch power assembly 154 but permits flow in the opposite direction, and a counterbalance pilot line 194c. Similar to the clutch sequence valve assembly 192, the counterbalance pilot line 194c serves only to open the relief valve 194a when a primary pilot line 200 fails to do so. It is also noted that the primary pilot line 200 is connected to the second line 184 and is similarly configured to provide a step up in pressure. The illustrated counterbalance valve assembly 194 may likewise be purchased from Vickers as Part No. CBV1-12-S-0-A-50/36.

The circuit 176 includes a pilot line 202 for operating the check valve 196. As shown in FIG. 6, the pilot line 202 extends between the first line 182 and the valve 196 such that the fluid pressure within the first line 182 is supplied to the valve 196.

If desired, the check valve 196 and valve assemblies 190,192,194 may all be part of a valve block, as represented by the dashed lines referenced by the numeral 204 (see FIG. 6). The illustrated valve block 204 is provided with four ports 206,208 and 210,212 which form part the respective tailgate branches 182a,184a and clutch branches 182b,184b. As is often customary, the tailgate power units 36,38 and clutch power assembly 154 are connected to the respective ports 206,208 and 210,212 by flexible hoses which form the corresponding parts of the branches 182a,184a and 182b, 184b.

The function of the sequencing circuit 176 will now be described in connection with the overall operation of the baler 10. A baling cycle will begin with the tailgate 34 in the closed position and the clutch 66 engaged. The powered crop delivery apparatus 60 will deliver material into the baling chamber 54 as the baler 10 is pulled along a windrow. The incoming crop material will be rolled and compacted into a bale by the bale forming mechanism 44, with the bale normally being permitted to reach its full size as represented by the letter "B" in FIG. 1. In any case, once the bale forming cycle is complete, the bale is wrapped by a suitable material (e.g., twine or mesh). It is noted that the wrapping mechanism (not shown) forms no part of the invention per se, and the baler 10 may therefore be provided with any suitable wrapping mechanism. Upon completion of the wrapping cycle, the bale is ready for ejection from the baling chamber 54.

As previously noted, the driving power to the bale forming mechanism 44 and crop delivery apparatus 60 is desirably disconnected so that these components are stopped while the tailgate is raised 34 during discharge of the wrapped bale. With the illustrated baler 10, this is simply accomplished by first adjusting the tractor remote valve (not shown) so that pressurized fluid is supplied to the port 178. The fluid flows through the first line 182, freely over the internal check valve 194b in the flow restriction valve assembly 194, and into the tailgate branch 182; however, the fluid flow is stopped at the tailgate sequence valve assembly 190 by its internal relief valve 190a and check valve 190b. The pressurized fluid also flows into the clutch branch 182b of the first line 182, freely over the internal check valve 192b of the clutch sequence valve assembly 192, and into the rod end of the clutch power assembly 154. The fluid returning from the clutch power assembly 154 flows along the second line 184 to the check valve 196. It is noted that the pilot pressure for opening the check valve 196 is relatively low so that the valve 196 is essentially opened as soon as pressurized fluid is supplied to the first line 182. In this respect, the check valve 196 does not block or restrict flow from the clutch power assembly 154 when it is desired to disengage the clutch 66 and raise the tailgate 34. However, the check valve 196 does block fluid flowing from the tailgate power units 36,38 and clutch power assembly 154 to the port 180 when pressurized fluid is not being supplied to the port 178 (e.g., during the bale forming and wrapping cycles). The check valve 196 consequently locks the tailgate power units 36,38 and clutch power assembly 154 in their respective retracted conditions, whereby the tailgate 34 is locked in the closed position and disengagement of the clutch 66 is prevented.

Again, the fluid returning from the clutch power assembly 154 will flow unrestrictedly to the port 180 and is typically directed to a tractor fluid reservoir (not shown). The power assembly 154 will consequently retract and the clutch 66 is disengaged to drivingly disconnect the bale forming mechanism 44 and crop delivery apparatus 60 from the power source, all while the tailgate power units 36,38 retain the tailgate 34 in the closed position. Once the clutch power assembly 154 is fully retracted, the pressure in the first line 182 increases. The relief valve 190a is set so that the increased pressure level (i.e., the pressure within the pilot line 190c corresponding to full retraction of the clutch power assembly 154) causes the relief valve 190a to unseat, whereupon the pressurized fluid flows to the tailgate power units 36,38 and causes the same to extend so that the tailgate 34 is raised. The fluid returning from the rod ends of the tailgate power units 36,38 flows along the second line 184 and freely over the open check valve 196. The tailgate sequence valve assembly 190 is consequently operable to prevent movement of the tailgate 34 out of its closed position until the clutch 66 is disengaged.

Once the tailgate 34 is sufficiently open, the bale will typically fall from the chamber 54 to the ground by gravity, although structure may be provided for assisting the bale out of the chamber 54 (e.g., a pair of retractable bale push bars or so-called "kickers"). It is noted that the circuit 176 also includes a manually operated tailgate lockout valve 214 interposed within the tailgate branch 182a of the first line 182. The lockout valve 182 is operable to fluidly disconnect the tailgate power units 36,38 from the first line 182, with the valve 182 consequently being particularly useful in retaining the tailgate 34 in the raised position during, for example, maintenance of the baler 10.

When it is desired to lower the tailgate 34 (e.g., after the bale has been discharged), the tractor remote valve (not shown) is adjusted to reverse the flow in the circuit 176. Pressurized fluid is consequently supplied to the port 180, and such fluid flows along the line 184, into the clutch branch 184b, and to the cylinder end of the clutch power assembly 154. However, extension of the power assembly 154 and consequential re-engagement of the clutch 66 is initially prevented by the clutch sequence valve assembly 192. Particularly, the normally-closed internal relief valve 192a and check valve 192b of the assembly 192 blocks return fluid flowing from the power assembly 154. The pressurized fluid supplied to the port 180 also flows to the tailgate branch 184a and to the tailgate power units 36,38. The tailgate power units 36,38 are consequently urged into the retracted condition, and the return fluid from the units 36,38 flows through the tailgate branch 182a, freely over the check valve 190b of the tailgate sequence valve assembly 190, and to the flow restriction valve assembly 194. As shown in FIG. 6, the relief valve 194a of the assembly 194 normally prevents such return flow along the first line; however, the setting of the valve 194a and the stepped pressure provided by the pilot line 200 cooperate to unseat the valve 194a virtually immediately upon pressurized fluid flow in the second line 184. Thus, the return fluid from the tailgate units 36,38 essentially flows unrestrictedly to the port 178, such that lowering of the tailgate 34 toward the closed position occurs as soon as the pressurized fluid is supplied to the port 180. However, the flow restriction valve assembly 194 does prevent the tailgate 34 from slamming shut. In other words, the assembly 194 regulates flow from the tailgate power units 36,38 so that the latter do not retract too quickly. It is particularly noted that the relief valve 194a will close when the pressure in the second line 192 falls below the desired minimum, such pressure drop often being caused as a result of the power units 36,38 retracting at a rate that is faster than the rate which would otherwise be caused by the pressurized fluid in the second line 184. It is also noted that the flow restriction valve assembly 194 maintains the tension of the belts 46 during lowering of the tailgate 34, as the belt tension cylinders 216 and 218 (only two of the tension cylinders being shown in FIG. 1) are preferably also connected to the sequencing circuit in the usual manner.

Again, as the tailgate 34 is lowered, the clutch sequence valve assembly 192 prevents re-engagement of the clutch 66. However, once the tailgate power units 36,38 have fully retracted (i.e., once the tailgate 34 is closed and latched), the fluid pressure within the second line 184 will increase. The configuration of the relief valve 192a and the stepped up pressure provided by the pilot line 198 cooperate to unseat the relief valve 192a once the tailgate power units 36,38 have fully retracted. The return fluid from the clutch power assembly 154 is consequently permitted to flow through the open valve 192a, along the clutch branch 182b of the first line 182, through the open relief valve 194a, and out the port 178. This permits the power assembly 154 to extend, and the clutch 66 is eventually re-engaged to drivingly connect the bale forming mechanism 44 and crop delivery apparatus 60 to the input shaft 68. Accordingly, the clutch sequence valve assembly 192 is operable to ensure that the tailgate 34 is closed and latched before the clutch 66 is re-engaged. Once driving power is returned to the bale forming mechanism 44 and the crop delivery apparatus 60, the next baling cycle may be started.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. In a round baler including driveable baler components, an openable tailgate that is disposed in a closed position during bale formation, and a clutch operable to drivingly connect the components to a power source when engaged and drivingly disconnect the components from the power source when disengaged, the improvement comprising:

a fluid piston and cylinder unit operably connected to the tailgate to control movement of the tailgate into and out of the closed position;

a fluid piston and cylinder assembly operably connected to the clutch to control engagement and disengagement of the clutch; and a sequencing circuit fluidly connecting the unit and the assembly to a common pressurized fluid source, said sequencing circuit controlling fluid flow to the unit and the assembly so that the clutch is disengaged before any substantial movement of the tailgate out of the closed position, said sequencing circuit controlling fluid flow to the unit and the assembly so that the clutch is not engaged until at least substantially all movement of the tailgate toward the closed position has been effected.

2. In a round baler as claimed in claim 1, said sequencing circuit including first and second lines, each connecting the unit and the assembly to the fluid source, said first line including a tailgate branch that leads to the unit and a clutch branch that leads to the assembly.

3. In a round baler as claimed in claim 2, said sequencing circuit including a tailgate sequence valve for preventing the unit from moving the tailgate out of the closed position until the clutch is disengaged.

4. In a round baler as claimed in claim 3, said tailgate sequence valve comprising a pilot-operated valve interposed within the tailgate branch of the first line and configured to block fluid flow to the unit until a pilot pressure corresponding to clutch disengagement is supplied to the valve.

5. In a round baler as claimed in claim 3, said sequencing circuit including a clutch sequence valve for preventing engagement of the clutch until the tailgate is moved into the closed position.

6. In a round baler as claimed in claim 5, said clutch sequence valve comprising a pilot-operated valve interposed within the clutch branch of the first line and configured to block fluid flow from the assembly until a pilot pressure corresponding to complete movement of the tailgate into the closed position is supplied to the valve.

7. In a round baler as claimed in claim 5, said sequencing circuit including a flow restrictor for regulating movement of the tailgate toward the closed position.

8. In a round baler as claimed in claim 7, said flow restrictor comprising a pilot-operated valve interposed within the first line and configured to block fluid flow in a direction away from the unit when the fluid pressure in the second line falls below a predetermined minimum.

9. In a round baler as claimed in claim 7, said sequencing circuit including a check valve for fluidly locking the tailgate in the closed position and preventing clutch disengagement until pressurized fluid is supplied to the circuit to disengage the clutch and move the tailgate out of the closed position.

10. In a round baler as claimed in claim 9, said check valve being interposed within the second line and configured to block fluid flow from the unit and the assembly until pressurized fluid is supplied to the first line.

11. A round baler comprising:

bale forming mechanism operable to form a bale within a chamber that is at least in part defined by the mechanism;

a material delivery apparatus configured to deliver material to the chamber;

a clutch operable to drivingly connect the bale forming mechanism and crop delivery apparatus to a power source when engaged and drivingly disconnect the bale forming mechanism and crop delivery apparatus from the power source when disengaged;

a piston and cylinder assembly operably connected to the clutch to control engagement and disengagement of the clutch;

a tailgate that is disposed in a closed position during bale formation and is openable to permit discharge of the bale from the baling chamber;

a pair of fluid piston and cylinder units operably connected to the tailgate to control movement of the tailgate into and out of the closed position; and a sequencing circuit fluidly connecting the units and the assembly to a common pressurized fluid source, said sequencing circuit controlling fluid flow to the units and the assembly so that the clutch is disengaged before the tailgate is moved out of the closed position and the clutch is not re-engaged until the tailgate has been returned to the closed position, said clutch including a pair of outer compression plate assemblies, an inner friction disk located between the plate assemblies, and an input shaft connected between the friction disk and the power source, said compression plate assemblies being drivingly connected to the bale forming mechanism and the crop delivery apparatus, said compression plate assemblies being yieldably biased toward one another and into driving engagement with the friction disc wherein driving power is supplied to the bale forming mechanism and the crop delivery apparatus, at least one roller connected to the assembly and configured to progressively move the plate assemblies from one another to drivingly disconnect the plate assemblies from the friction disc as the assembly is retracted.

12. A round baler as claimed in claim 11, said sequencing circuit including first and second lines, each connecting the units and the assembly to the fluid source, said first line including a tailgate branch that leads to the units and a clutch branch that leads to the assembly.

13. A round baler as claimed in claim 12, said sequencing circuit including a tailgate sequence valve for preventing the units from moving the tailgate out of the closed position until the clutch is disengaged.

14. A round baler as claimed in claim 13, said tailgate sequence valve comprising a pilot-operated valve interposed within the tailgate branch of the first line and configured to block fluid flow to the units until a pilot pressure corresponding to clutch disengagement is supplied to the valve.

15. A round baler as claimed in claim 13, said sequencing circuit including a clutch sequence valve for preventing engagement of the clutch until the tailgate is moved into the closed position.

16. A round baler as claimed in claim 15, said clutch sequence valve comprising a pilot-operated valve interposed within the clutch branch of the first line and configured to block fluid flow from the assembly until a pilot pressure corresponding to complete movement of the tailgate into the closed position is supplied to the valve.

17. A round baler as claimed in claim 15, said sequencing circuit including a flow restrictor for regulating movement of the tailgate toward the closed position.

18. A round baler as claimed in claim 17, said flow restrictor comprising a pilot-operated valve interposed within the first line and configured to block fluid flow in a direction away from the units when the fluid pressure in the second line falls below a predetermined minimum.

19. A round baler as claimed in claim 17, said sequencing circuit including a check valve for fluidly locking the tailgate in the closed position and preventing clutch disengagement until pressurized fluid is supplied to the circuit to disengage the clutch and move the tailgate out of the closed position.

20. A round baler as claimed in claim 19, said check valve being interposed within the second line and configured to block fluid flow from the units and the assembly until pressurized fluid is supplied to the first line.

* * * * *